US008150606B2

(12) United States Patent
Kiessling et al.

(10) Patent No.: US 8,150,606 B2
(45) Date of Patent: Apr. 3, 2012

(54) IGNITION SYSTEM, EASY TO START FOR INTERNAL COMBUSTION ENGINES

(75) Inventors: Leo Kiessling, Cadolzburg (DE); Marek Lajda, Fürth (DE)

(73) Assignee: Prufrex-Elektro-Apparatebau, Inh. Helga Muller, Geb Dutschke, Cadolzburg (DE)

( * ) Notice: Subject to any disclaimer, the term of this patent is extended or adjusted under 35 U.S.C. 154(b) by 95 days.

(21) Appl. No.: 12/240,130

(22) Filed: Sep. 29, 2008

(65) Prior Publication Data
US 2009/0084368 A1    Apr. 2, 2009

(30) Foreign Application Priority Data

Sep. 27, 2007 (EP) .................................. 07117400

(51) Int. Cl.
*G06F 19/00* (2011.01)
*G06G 7/70* (2006.01)
*F02P 3/06* (2006.01)
(52) U.S. Cl. ..................... 701/113; 123/601; 123/596
(58) Field of Classification Search .................. 123/601, 123/406.56, 596, 599, 600, 605, 618; 701/110, 701/112, 113
See application file for complete search history.

(56) References Cited

U.S. PATENT DOCUMENTS

| | | | | |
|---|---|---|---|---|
| 3,669,086 A * | 6/1972 | Beuk et al. | ............... | 123/406.57 |
| 3,739,759 A | 6/1973 | Sleder | | |
| 4,259,938 A * | 4/1981 | Johansson | ..................... | 123/599 |
| 4,856,488 A * | 8/1989 | Okuda | ......................... | 123/599 |
| 5,069,193 A * | 12/1991 | Erhard | .......................... | 123/335 |
| 5,513,619 A * | 5/1996 | Chen et al. | ..................... | 123/601 |
| 5,878,709 A * | 3/1999 | Andersson et al. | .... | 123/198 DC |
| 6,581,584 B2 * | 6/2003 | Sato et al. | ..................... | 123/599 |
| 6,691,689 B2 * | 2/2004 | Kiessling | ....................... | 123/603 |
| 6,761,148 B2 * | 7/2004 | Kiessling | ................. | 123/406.57 |
| 7,069,921 B1 * | 7/2006 | Kolak et al. | .................... | 123/599 |
| 7,156,075 B2 * | 1/2007 | Kiessling | ................. | 123/406.56 |
| 7,171,948 B2 * | 2/2007 | Shimoyama et al. | .... | 123/406.57 |
| 2002/0185108 A1 * | 12/2002 | Fewell, Jr. | ................ | 123/406.56 |
| 2003/0056755 A1 * | 3/2003 | Kiessling | ................. | 123/406.24 |
| 2003/0089336 A1 * | 5/2003 | Kiessling | ................. | 123/406.57 |

FOREIGN PATENT DOCUMENTS

| | | |
|---|---|---|
| DE | 10 2004 059070 A1 | 2/2006 |
| EP | 1 178 208 A | 2/2002 |
| EP | 1 496 249 A | 1/2005 |
| FR | 2 639 677 A | 6/1990 |
| JP | 09 140070 A | 5/1997 |

* cited by examiner

*Primary Examiner* — Stephen K Cronin
*Assistant Examiner* — Sizo Vilakazi
(74) *Attorney, Agent, or Firm* — Frank H. Foster; Kremblas & Foster

(57) ABSTRACT

An electrical ignition method for a combustion engine employing the use of an arrangement of several coils and a magnet wheel or magnet generator which rotates synchronously with the combustion engine, wherein the magnetic field of the magnet generator intermittently flows through the coils and therein generates a sequence of magnetic flux changes per revolution, whereby a sequence of corresponding alternating voltage half-waves is induced in the coils, which are used for charging an energy storage element. Through the use of a stop and/or switch-off system for the combustion engine, the disclosed method prevents a discharge of the energy storage element during the stopping and coast down procedure of the combustion engine and/or to actuate its charging, so that a charged energy storage element is available for the next start of the combustion engine.

14 Claims, 6 Drawing Sheets

IGNITION SYSTEM, EASY TO START FOR INTERNAL COMBUSTION ENGINES

BACKGROUND OF THE INVENTION

1. Technical Field of the Invention

Figure 1:
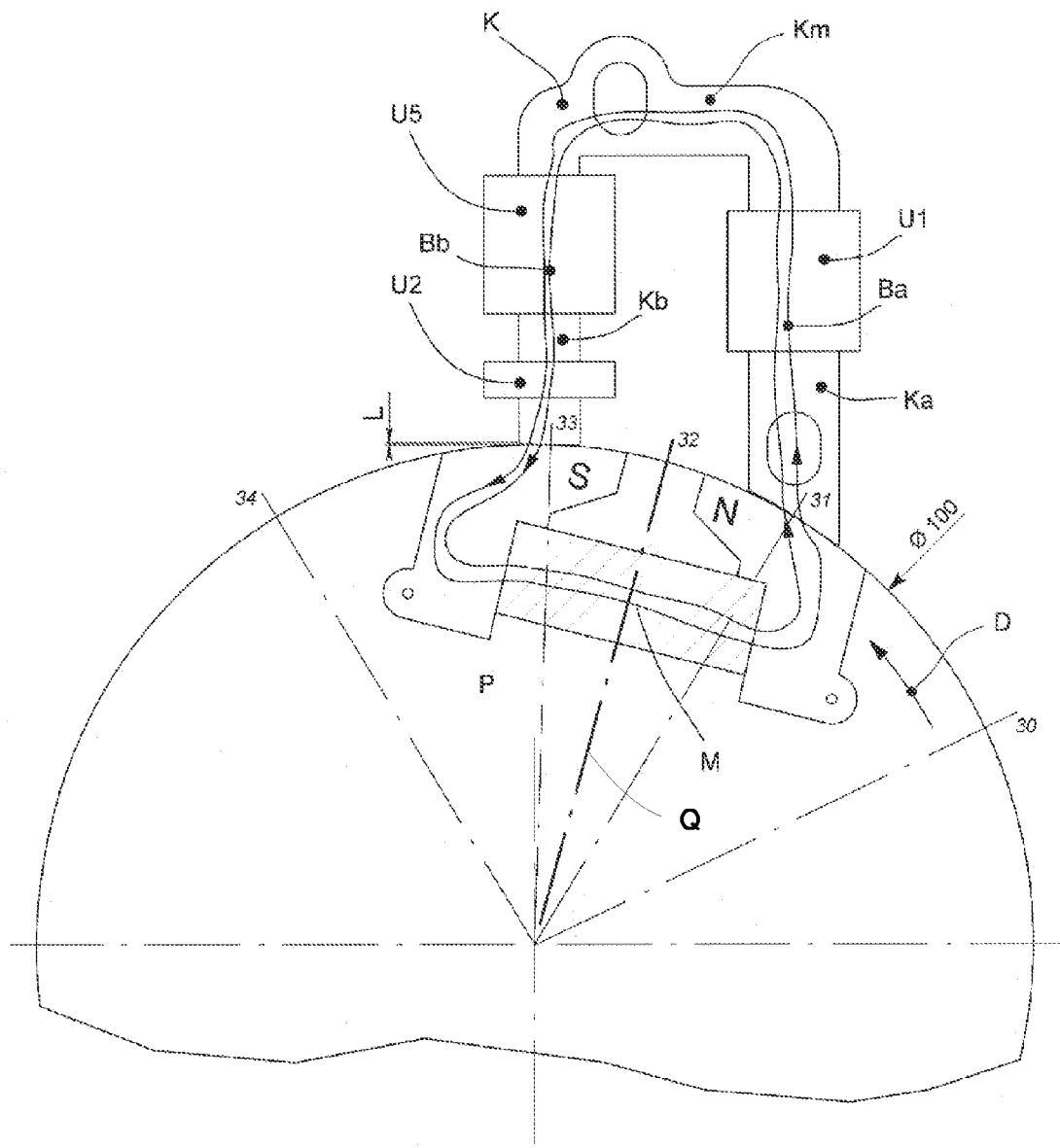

The invention relates to an electrical ignition method for combustion engines, wherein an arrangement of a plurality of electrical coils and a magnetic generator are used, which is coupled with the internal combustion engine via its crankshaft, for example, and rotates synchronously with it. In this context, the magnetic field of the magnetic generator flows intermittently through the coils and for each revolution a sequence of magnetic flux changes are generated. As a result, corresponding alternating voltage half-waves are induced in the coils.

The invention teaches that the alternating voltage half-waves in the ignition system are used for the following:

an energy storage element, for example an ignition capacitor, is charged with the alternating voltage half-waves and is discharged through actuation of an ignition switch via the primary coil windings of a pulse transformer for initiating an ignition spark for the cylinder or other combustion chamber of the combustion engine.

The alternating voltage half-waves are scanned, acquired, processed and/or evaluated and/or filtered by a microelectronic and/or programmable controller. An output result of this processing process consists in the determination of an ignition point in dependence from the acquired and evaluated alternating voltage half-waves and/or from another state of the combustion engine, for example from its rotational position or rotational speed. The ignition switch for generating an ignition spark is actuated according to the ignition point determined by the controller.

Furthermore, alternating voltage half-waves are at least partially supplied to the controller for its voltage and/or current supply.

The ignition of the gasoline/air mixture in the combustion chamber and/or cylinder of the combustion engine requires, as is actually known, a spark-over between the electrodes of the spark plug. For this purpose, a high charging voltage in the energy storage element, on the ignition capacitor, for example, is required. The charging voltage is dependent on the amplitude of the alternating voltage half-wave from the coil with which the energy storage element and/or the ignition capacitor is coupled. The amplitude height in turn depends on the rotational speed of the combustion engine. If this is low, the amplitude of the alternating voltage half-waves from the respective charging coil remains low, and the element and/or the ignition capacitor are charged correspondingly low. This circumstance can negatively affect the achievable starting speed range. In order to solve this problem, the effort in designing the magnet system and the charging coil could increase, which would mean higher manufacturing costs and require a larger installation space for the ignition system.

2. Prior Art

EP 1 691 053 A2 describes a control circuit for a capacitor discharge ignition system with a switch-off and/or coast down circuit. This responds during activation of a stop switch by discharging the ignition capacitor. By means of an RC [resistance-capacitance] delay element, the discharge of the ignition condenser is prolonged, whereby a storage of the charge for the next ignition pulse is prevented. EP 1 496 249 illustrates in its FIG. 15 that an ignition switch is controlled with a signal s4 via the complete rotation of the engine, in order to prevent the charging of the ignition capacitor by short-circuiting the positive charging coil half-waves (see output voltage section e1 of the output voltage E in FIG. 15a) even after the detection of the "switch-off state" (see stop time h1 in FIG. 15c) and also after the release of the switch-off switch 10 (see FIG. 12 there).

DE 10 2004 059 070 A1 (English language equivalent: U.S. Pat. No. 7,156,075 B2) describes an ignition method with a stop switch for combustion engines, in order to accomplish that they are switched-off and can coast down. The switch-off procedure is initiated with a pushbutton as a switching element. This stop switch prevents triggering the ignition. A controller arranged in the ignition circuit determines the state of the stop switch through evaluation of signals with respect to the state of the combustion engine. After releasing this pushbutton, it is necessary to ensure that no further ignition spark is generated until the engine has stopped. According to an alternative taught by this publication, the charging current is short-circuited by the ignition switch in order to prevent charging the ignition capacitor. With this ignition system, particular attention has been given to simplify and accelerate the restart or new start of the combustion engine. A new start should be possible immediately or still during the coast down of the engine. An alternative teaching is to prevent an actuation of the ignition switch which discharges the (charged) ignition capacitor, with the result that no further ignition sparks are generated any longer. To be precise, the drive pulse for the ignition switch is suppressed by the stop switch. Consequently, although the ignition capacitor continues to be charged also during the coast down, it will not be discharged, however. For the next (re-) start of the combustion engine, an already completely charged ignition capacitor can thus be available, which can be immediately discharged with the first revolution to generate an ignition spark.

If the ignition occurs at low rotational speeds too early before the top dead center (TDC) of the piston of the combustion engine, there is the risk of a kick-back [sic]. In the operating range and/or in normal continuous engine operation, advanced ignition points (in practice, approximately 15°-35° before TDC) are required in order to ensure optimum combustion, however. For remedy, refer to U.S. Pat. No. 5,069,193, EP 1 146 226 A2 and EP 1 178 208 A2. These publications teach that with increasing rotational speeds, the ignition point is increasingly advanced with respect to TDC. For this purpose, use is made of the effect that with increasing rotational speed and the associated increase in the magnetic generator angular velocity, the amplitudes and the slopes of the induced voltage half-waves become increasingly bigger. Due to the higher slope of the half-wave, a preset trigger voltage threshold for triggering the ignition with increasing speed is achieved earlier and/or faster. The precondition for this is that the first half-wave with each revolution is used for initiating the ignition triggering. Ignition systems according to the aforementioned patent publication, however, have the disadvantage that only with the first half-wave induction within the second revolution of the combustion engine, the ignition switch for discharging the ignition capacitor can be controlled, which was previously charged from the half-waves of the first revolution. During the first engine revolution, however, an ignition cannot be triggered because of the discharge which had previously occurred and/or due to the lack of charging of the ignition capacitor.

Furthermore, reference is also made to the older, European patent application 07 113 616.2 (English-language equivalent: U.S. patent application Ser. No. 12/183,092), the content of which is herewith incorporated into this application. In that older application, it is proposed that the ignition switch not be controlled beyond 360° or near 360° in the "switch-off" operating mode, but only in the angular ranges in which an ignition capacitor would be charged from the load coil or other coils. It is taught that within these limited angular ranges, the ignition switch be controlled either through a continuous pulse or through a burst and/or pulse repetition, where the intervals between the single pulses can be selected so far apart that the voltage value of the ignition capacitor is not increased to the extent that during the next switching on of the ignition discharge switch through the discharge of the ignition capacitor, a spark-over on the spark plug could be formed. For this purpose, FIG. 2-1c of the aforementioned old patent application is referred to. The duration of the intervals between the control pulses can be stored in the memory of the controller and have different values, depending on the rotational position and the rotational speed. In addition, it is proposed that below a certain rotational speed, in spite of switching-off the spark, the control of the ignition switch not be short-circuited but instead to no longer control the ignition switch. The rotational speed must be arranged sufficiently low so that the ignition capacitor is not charged with inadmissibly high voltages in spite of absent discharge processes, in order to avoid the risk of a dielectric breakdown in the ignition capacitor.

OUTLINE OF THE INVENTION

One object of the invention consists in that a control methodology for an ignition system, in particular a capacitor ignition system, be developed, which permits starting a combustion engine with low need of power, and in particular to start again after brief intervals (almost like a start-stop operation). In order to achieve easy starting characteristics, particularly during the restart after short intervals which are initiated with a stop pushbutton, for example, a combination of the following features or feature groups are proposed within the scope of the invention:

within the scope of the ignition method as taught by the invention, analog and/or microelectronic, particularly programmable control means are used which are already functional at low rotational speeds and alternating voltage half-waves of appropriately low amplitudes and can so securely detect the rotational position or angular position of the magnetic generator. The necessary supply voltage for the microelectronic controls, in particular microcontrollers, must be suitable for bleed-off from the coils conducting the half-waves within a few degrees of angle.

In order to achieve ignition without back kick, an ignition timing device is used which shifts the ignition point at relatively low rotational speeds (for example 150 RPM-250 RPM) into a range around the TDC (for example 5 degrees of angle before or 5 degrees of angle after TDC) and advances it in relation to TDC as the rotational speed increases.

A power section is utilized which can still provide a sufficiently high high-voltage pulse at the aforementioned lower rotational speed range in order to generate a spark-over in spite of the low rotational speeds and high pressures in the combustion chamber of the piston cylinder of the combustion engine, near and/or in a range around the TDC. This is ensured by a switch-off system, which does not discharge the ignition capacitor or other energy storage device during a stopping procedure and/or when the engine speed is lowered during a switch-off procedure. Consequently, a sufficiently charged ignition capacitor and/or other energy storage device for a new ignition spark is available during a restart. For this purpose, it is useful to design the ignition capacitor circuit, for example, with high resistance, in that for example the stop switch does not put load onto the charging coil and the ignition capacitor, but that the control input (for example the gate of the thyristor) of the ignition discharge switch is connected to ground. This prevents it from being controlled through a microcontroller, for example. Alternatively, controlling would also be conceivable only in specific angular ranges and/or at certain rotational speeds (see the older application EP 07 113 616.2 that was addressed above). A further possibility for a high-resistance concept consists in that the capacitor discharge resistance (which is frequently sized within the megaohm range and ensures a slow discharge of the capacitor after the switch-off) that is connected in parallel to the ignition capacitor of the ignition capacitor which is actually known in the prior art, is omitted.

The ignition method as taught by the invention is suitable for use with a capacitor ignition system for small internal combustion engines, in particular for hand-manipulated equipment such as chainsaws. In this context, the scope of the invention basically permits the use of analog as well as microelectronic control elements.

The general inventive concept includes the combination of
   switching-off the combustion engine while retaining a
      fully charged capacitor, and
   ignition advance in the starting range.

On this basis, the ignition can be so designed that it will trigger an ignition spark on the spark plug already during the first pass through TDC (compression cycle) and at low angular velocities (for example in the range of 200 RPM) and that therefore an internal combustion engine can start. This requires only a small pull with the starting rope for the engine (practical test: above a point of pressure of approximately 15 cm), which is beneficial when only little space is available. The "point of pressure" is to be understood as a rotational position of the engine near TDC at which the increasing compression of the fuel mixture in the engine cylinder requires the exertion of a steeply increasing torque in order to crank over the engine by means of pulling a rope. For this purpose, a starting rope of approximately 0.8 m in length is suitable, which enables five to six passes through TDC.

Based upon the invention, an ignition spark can be advantageously realized already during the first pass through TDC at a relatively slow crankshaft speed (for example around 200 RPM). This effect is particularly advantageous for restarting the engine, or after brief intervals. Because, according to an ignition system as taught by the invention, a rotational angle of the crankshaft of preferably less than 30° before TDC and the aforementioned low angular velocity is already sufficient in order to achieve an effective ignition spark and thus a start of the combustion engine. Consequently, only a small pull (preferably less than 20 cm) and a low need of power is required on the starting rope in order to make the engine operational.

Based upon the combination of the features as taught by the invention, such as
   advancing the ignition point in the starting speed range for
      achieving ignition without back kick during the start,
   realization of a spark-over at low rotational speeds, particularly in the starting speed range and
   build-up of a supply voltage for the ignition control
      within a few degrees of angle at slow crankshaft rotation (see above), particularly when the ignition control comprises a microcontroller,
   the advantage of an easy to start ignition system can be
      realized. In this instance, it is necessary to arrange the ignition point in the low (start-) rotational speed range close to and/or within the range of the TDC.

Within the scope of the invention, the charge of the energy storage element, an ignition capacitor, for example, which originates from the operation of the combustion engine prior to the last switch-off, is neutralized for the next start. When the engine is stopped and coasts down, no further discharge of the energy storage element and/or ignition capacitor for an ignition spark is required any longer. When using a stop pushbutton or stop switch in order to initiate the stop and/or switch-off system of the combustion engine, the energy storage element will continue to be charged, beginning from when the stop switch element is actuated until the engine has stopped turning.

A further favorable circumstance can be the fact that still in the warm condition of the combustion engine (shortly after switch-off), the combustion chamber of the piston cylinder still contains an ignitable mixture, which is beneficial for the next start with a powerful ignition spark during the first pass through TDC. According to the invention, it is therefore proposed that a stop and/or switch-off system be used which on the one hand does not prevent the charging of the respective ignition capacitor of the energy storage element. Alternatively, or in addition, it is within the scope of the ignition method as taught by the invention that the discharge of the energy storage element be prevented.

Corresponding to the above incorporated older patent application EP 07 113 616.2, it is within the scope of the invention that in the "switch-off" operating mode, at least in the lower rotational speed range, the ignition spark switch-off can be achieved through the fact that the ignition switch is no longer triggered and that a discharge of the energy storage element up to the standstill of the combustion engine does therefore no longer occur. When the standstill is reached, the energy storage element and/or the ignition capacitor is therefore securely charged with a sufficiently high voltage value. This achieves that during a restart, a significantly higher ignition energy (so-called starting-voltage boosting) is available after the combustion engine has been at rest for a few minutes, than with a start not utilizing this effect. This embodiment of the invention is particularly beneficial for engines equipped with manual starting devices. For this purpose, components with low leakage currents are selected and used for the ignition system as taught by the invention in order to increase the interval period for a restart with starting-voltage boosting. In this way, a high ignition energy is available for the first revolution after a break in operation. This is beneficial when starting the combustion engine, because with a warm internal combustion engine there is still an ignitable mixture in the induction tract for some time after the engine is switched off.

Practical tests have shown that after a break of about 20 minutes following the switch-off procedure, a powerful ignition spark of 10 kV can still be produced during the first pass through TDC by means of the ignition method as taught by the invention.

As discussed earlier above, for this purpose it is useful to design the energy storage element as well as the ignition capacitor as high-resistance, for example, in that the discharge resistance normally used is connected parallel to the ignition capacitor and to ground, if necessary, is omitted, so that only an insignificant leakage current flow remains. The latter is achievable with standard components.

With the low starting speeds that can be achieved with the pushbutton stop switch as taught by the invention, there is the risk that the engine could be accidentally started if it is turned during installation or service work. This could be obviated with an optional embodiment of the invention according to which the pushbutton stop switch is provided with an additional rest detent position, such as to prevent an unintentional start. Such switch is actually known (see DE 101 15 359 A1).

Embodiment with push button stop: If according to an embodiment of the invention, the discharge of the ignition capacitor or other energy storage element during the switch-off procedure is dispensed with, then there is the risk that the ignition capacitor etc. can be overcharged. This can be obviated with an embodiment of the invention according to which the energy storage element is connected to voltage limiting components, such as varistors. Although this requires the use of more materials and is also associated with higher costs, it can be realized with relatively simple software engineering, however.

"Low-voltage stop" embodiment: with this switch-off procedure, the triggering input of the ignition switch, for example the gate of an ignition thyristor, can be connected to ground via a stop pushbutton or stop switch, as a result of which the discharge of the ignition capacitor or other energy storage element is prevented, such as is known from DE 19736 032 A1, for example.

According to FIG. 9 there, the stop pushbutton U 13 there prevents the triggering of the ignition switch U4 through a microcontroller U8.

Figure 2:
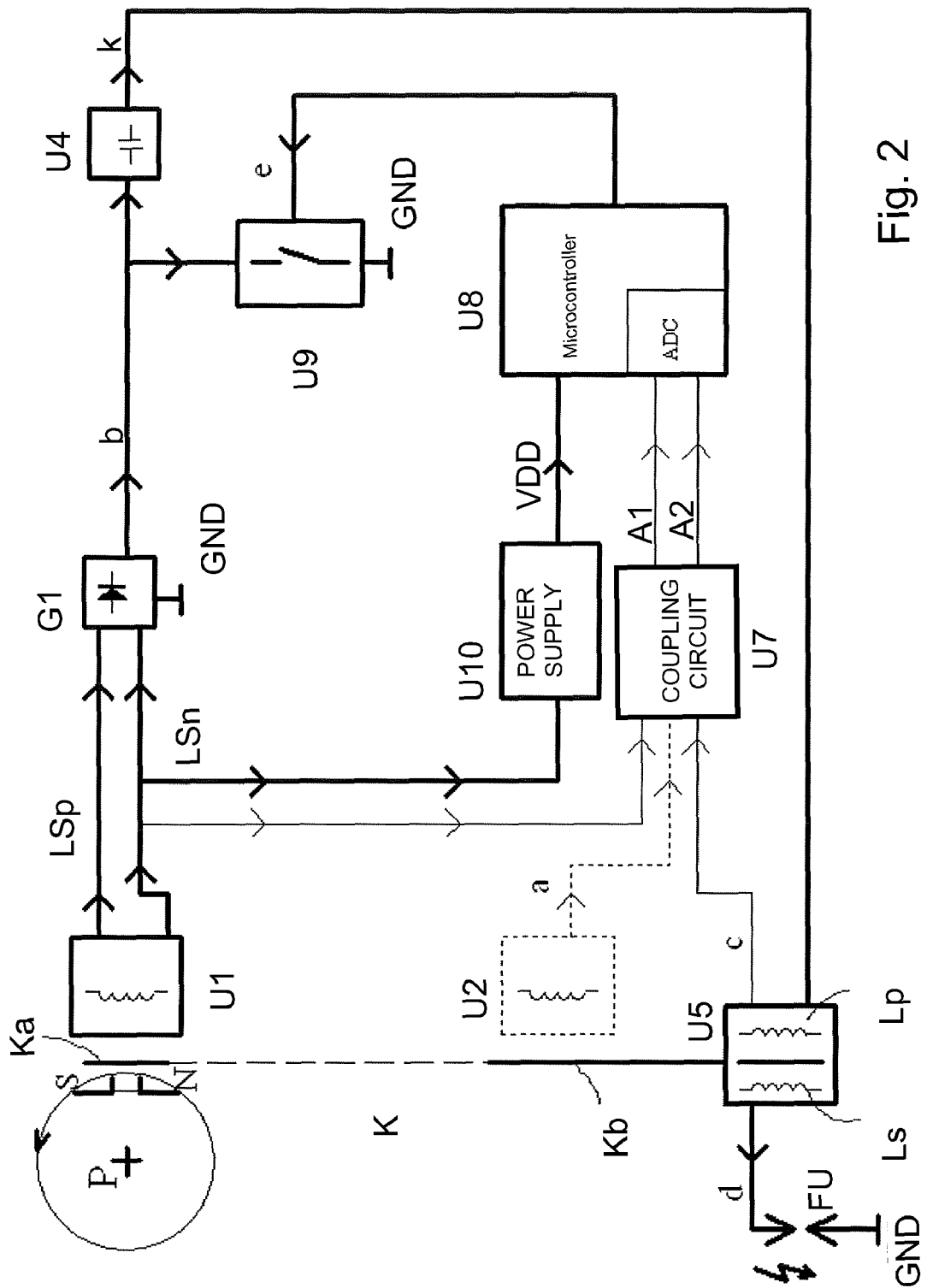
Figure 3:
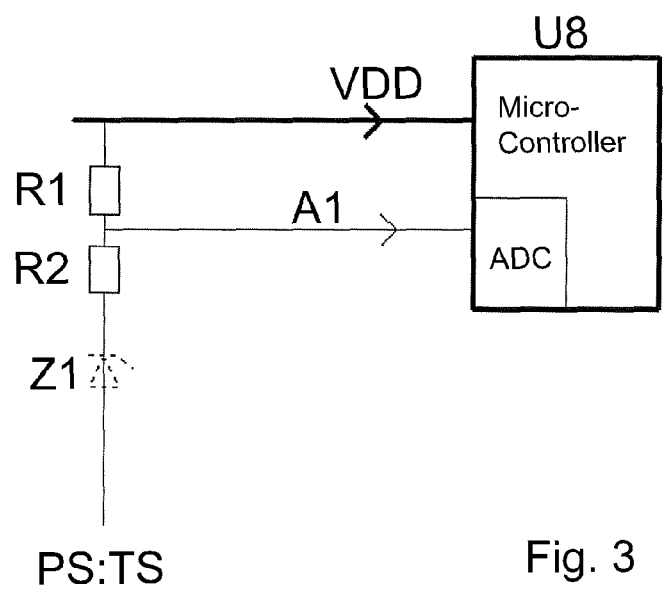
Figure 4:
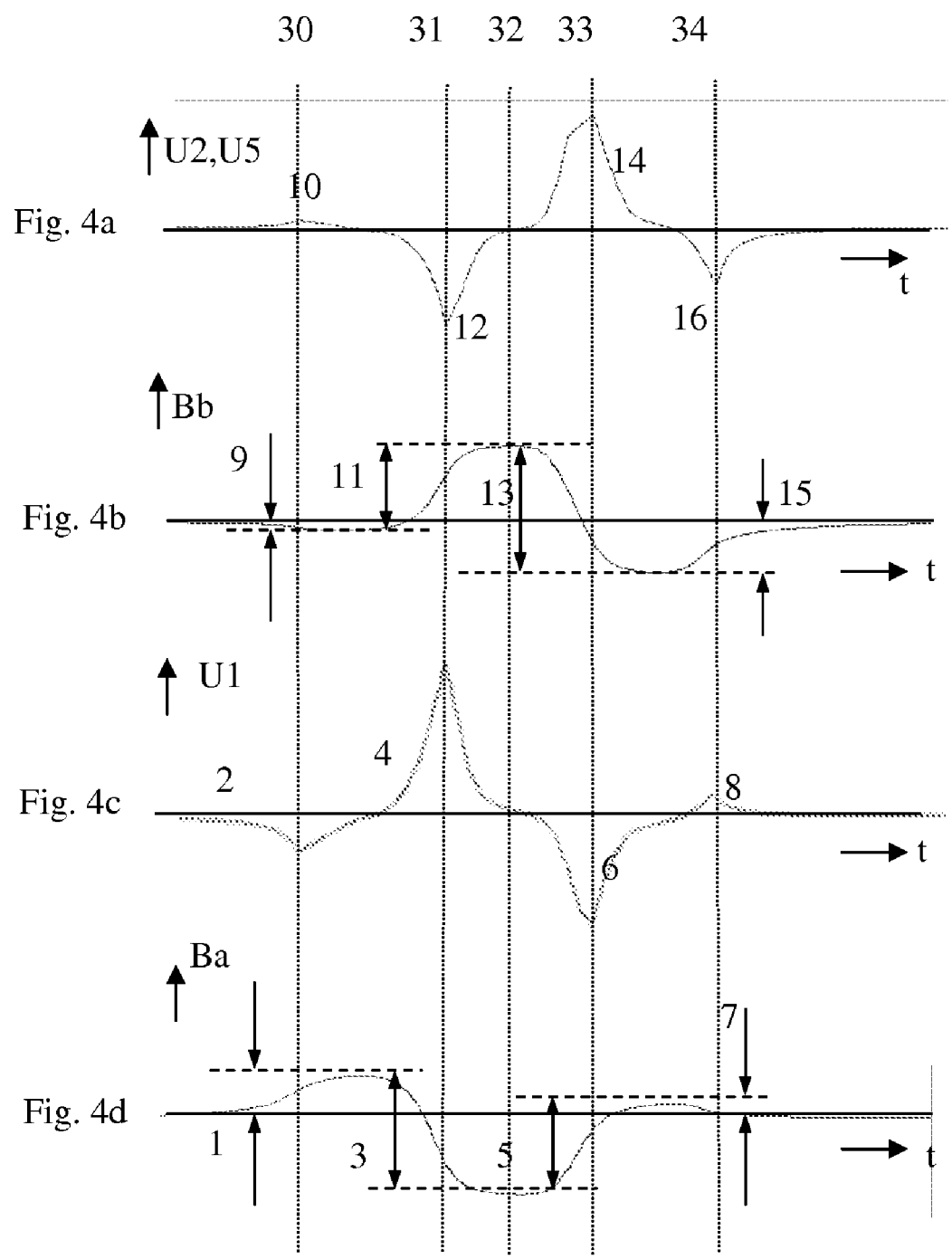
Figure 5:
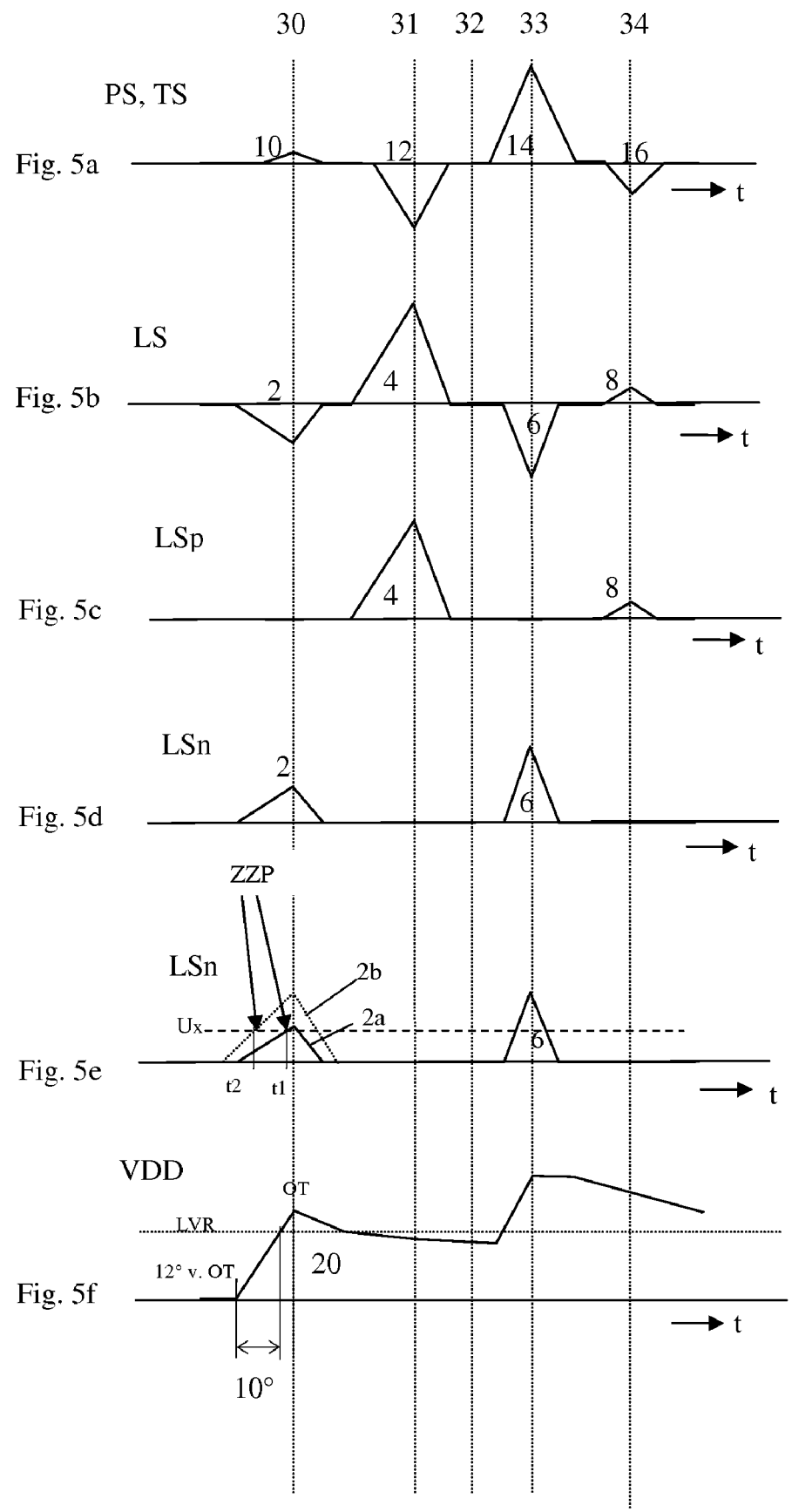
Figure 6:
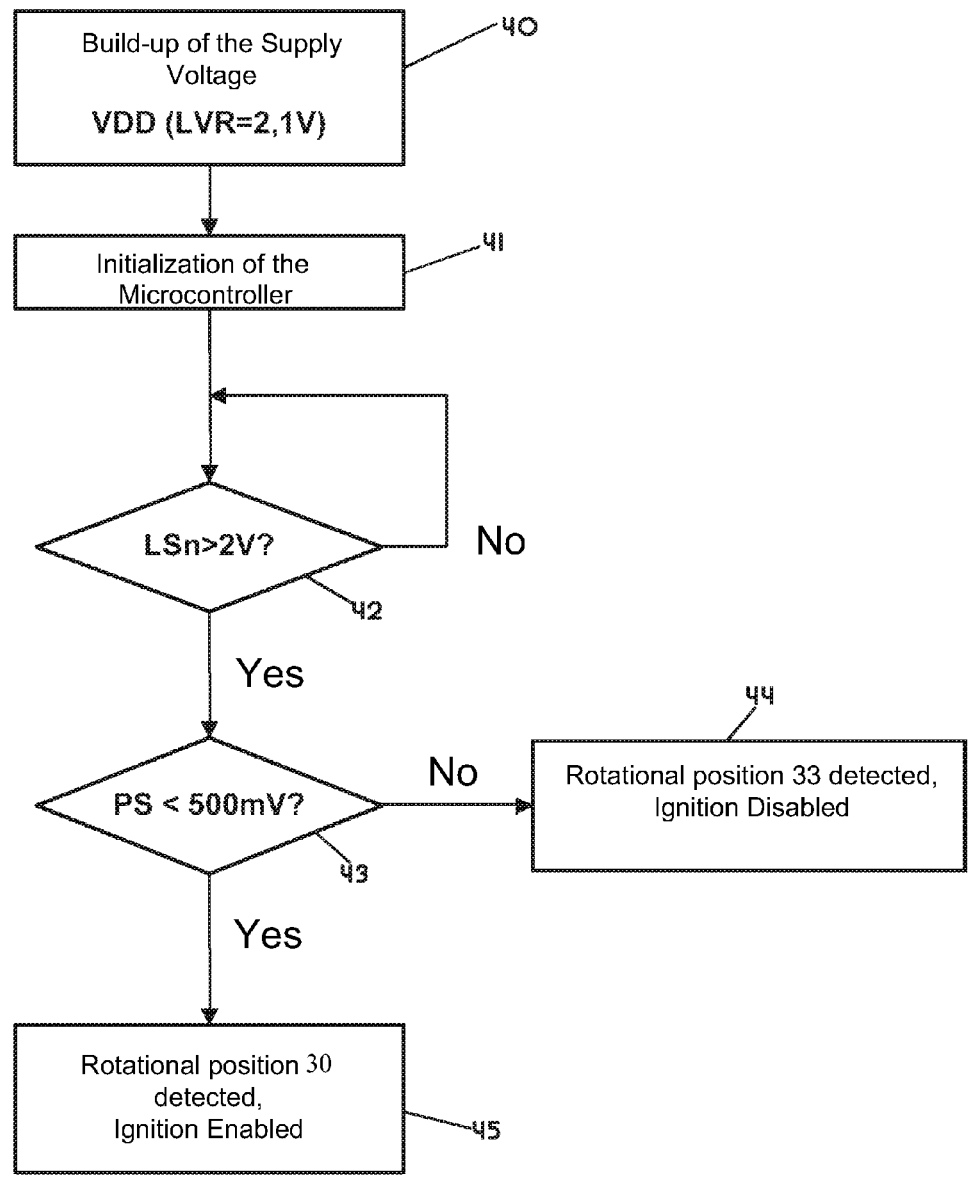

Further particulars, features, combination of features, effects and advantages based upon the invention result from the following description of preferred exemplary embodiments of the invention as well as from the drawings, as follows:

| | |
|---|---|
| FIG. 1 | is an axial plan view of a section of the magnet wheel as magnetic generator and the ignition module interacting therewith |
| FIG. 2 | is a schematic block diagram for an ignition module as taught by the invention |
| FIG. 3 | shows the behaviors of the voltages induced in the coils of the ignition module and magnetic flux through the iron core limbs over time and/or the respective equivalent rotation angle of the combustion engine |
| FIG. 4a, b, c | shows the respective behavior of the induced voltages in the coils of the ignition module schematically through the respective equivalent rotational angle of the combustion engine and/or the respective equivalent time interval |
| FIG. 4a | shows the voltage time curve of the primary coil of the pulse transformer or a possible trigger coil |
| FIG. 4b | shows the voltage time curve of the charging coil |
| FIG. 4c | shows the voltage time curve per revolution of the positive second and fourth half-wave of the charging coil, respectively |
| FIG. 4d | shows the voltage time curve after rectification per revolution of the first and the third alternating voltage half-wave from the charging coil, respectively |
| FIG. 5 | shows the modified circuit detail in the corresponding block diagram representation |
| FIG. 6 | shows a flow diagram for illustrating the detection of the angular position of the magnet wheel and/or the magnetic generator at low rotational speeds in context with the layout of the supply voltage for the microcontroller. |

According to FIG. 1, a magnet wheel P is arranged at the ignition system and coupled with an internal combustion engine (not shown) such that the magnet wheel P rotates synchronously with a crankshaft of the internal combustion engine. A permanent magnet M is structurally integrated in the peripheral area of the magnet wheel P, and magnetically conductive pole shoes S, N, are affixed around its pole areas. The aforementioned parts are the movable constituent parts of a magnetic generator P, M, S, N, which are rotated counter-clockwise by the internal combustion engine in a rotational direction D, for example. For this purpose, the magnetic poles and/or pole shoes S (South Pole), N (North Pole) are moved in their aforementioned sequence past an iron, soft-magnetic yoke core K each time, initially past its first limb Ka and then past its second limb Kb. The two limbs Ka, Kb, are connected to each other through a center section Km of the yoke core K, by forming a U-shape. With each rotation in direction D, the yoke core K and/or its limbs Ka, Kb are periodically subjected to a respective magnetomotive force Ba and/or Bb across an air gap L. The limb Ka which is first subjected to the magnetomotive force in rotational direction D is surrounded by a charging coil U1, in which a voltage is induced through the magnetic flux changes generated by the rotation past it.

According to FIG. 2, the output voltage of the charging coil U1 with its positive and negative signal forms LSp and/or LSn are supplied to a bridge rectifier G1, the output of which forms the charging voltage b for the energy storage elements U4, for example in the form of an ignition capacitor.

An ignition switch U9 which is connected with the input of energy storage element U4 and is switchable to ground is controlled in a specific angularity (ignition point ZZP) from a trigger circuit and/or control unit U8, so that the energy storage element U4 discharges itself via the primary coil Lp of a pulse transformer U5. According to FIG. 1, the pulse transformer is sleeve-mounted with its primary and secondary coil Lp, Ls, onto the second yoke core limb Kb, when viewed in rotational direction D, and surrounds it.

According to FIG. 2, the charging coil output for negative signal forms Lsn is—parallel to the bridge rectifier G1—still connected with the input of a voltage supply unit U10, which in accordance with the drawn embodiment generates on its output side the operating voltage VDD for control unit U8, a programmable microcontroller, for example. The control unit U8 is internally provided with an analog/digital converter ADC with at least two analog signal inputs A1, A2 for scanning of alternating voltage half-waves from the coil arrangement U1, U2, U5. A signal level attenuation circuit U7 is connected in series to these signal scanning inputs A1, A2, which can be adjustable via control outputs (not drawn) of the control unit U8 and be adapted to the respective signal strengths of the coil signals, for example. On the input side, the attenuation circuit U7 is connected with the output for negative signal forms LSn of charging coil U1 and (via a second input) with the primary voltage signal c of the primary coil Lp of the pulse transformer U5, in order to interconnect these signals with the signal scanning inputs A1, A2 of the control unit U8, once they are adapted. From the sequence of the coil voltage signals LSn, c of the charging coil and the primary coil Lp, the control unit U8 can determine the state of the internal combustion engine, including rotational speed, rotational position, rotational direction, and so can supply a drive pulse e to the ignition switch U9 on time. With the help of a clock generator (not drawn) that is externally connected to control unit U8, a timer or time meter can be developed internally in the control unit U8 (as a software routine, for example), which in combination with the analog/digital converter ADC, which, by using the alternating voltage half-waves from the charging coil U1, can measure the respective time period for different angle segments. Depending upon the evaluation of the time period of the acquired angle segments, the ignition switch U9 is then activated via the drive output e of control unit U8 at the determined ignition point. The discharge side of the ignition capacitor and/or energy storage element U4 is directly connected with the primary coil Lp of the transformer surrounding second yoke core limb Kb. Interconnected to that is the secondary coil Ls, which is designed for upward transformation [boosting] and which also surrounds the second yoke core limb Kb, whose output leads to ignition spark gap FU. By triggering the ignition switch U9 when the ignition capacitor U4 is charged, latter is discharged via the primary coil Lp of the pulse transformer U5. In the secondary coil Ls, which is interconnected with primary coil Lp, and which has a hundred times more windings than the primary coil Lp, a high-voltage pulse is generated, which causes a spark-over on the spark plug and/or ignition spark gap.

According to FIGS. 1 and 2, a trigger coil U2 (indicated by a stroked line) can optionally still surround the second, in the direction of rotation, yoke core limb Kb, and can be interconnected on the output side via the signal level attenuation unit U7 with the analog/digital converter ADC of the control unit U8. While the signals c from the primary coil Lp of the pulse transformer U5 for the detection of the rotational position of the magnet wheel, and the negative half-wave signals LSn from the charging coil U1 for the determination of the ignition point are normally sufficient for control unit U8, but if not, the signals of the trigger and/or auxiliary coil U2 on the second limb Kb, in the direction of rotation, would have to be used as well.

According to FIG. 3, the induced voltages PS and/or TS can optionally be indirectly acquired via a voltage divider with resistors R1, R2, which are arranged in series together, and one zener diode Z1 which is arranged in series thereto between the microcontroller operating voltage VDD and the primary coil Lp or the trigger coil U2, if necessary, so that the respective voltage value then lies within the measuring range of the analog/digital converter ADC, or—alternatively—any comparators of the microcontroller U8.

This can take into account the circumstance that the rotational direction of the first and third alternating voltage half-waves 10, 14 (see FIG. 4a bottom) of the primary or trigger coil Lp, U2 could have negative polarity.

With respect to the mode of operation of the ignition system as taught by the invention, the following is additionally explained below:

According to FIG. 1, the magnet wheel P of the magnetic generator P, M, S, N, runs counterclockwise through different, fixed rotational positions 30-34, which in FIG. 1 are respectively marked with a radial dash-dot symmetry line with the same numbering. These rotational positions 30-34 are also marked by means of vertical dotted lines in FIGS. 4 and 5 as abscissas on the respective time axes t, for the purpose of indicating the individual times at which the respective rotational positions 30-34 of the magnet wheel P occur with specific signals in the ignition control. Over the time t as abscissa, the individual signal curves from the ignition control are thus reciprocally represented for the same rotational angles of the internal combustion engine, but with different scaling along the respective ordinate. The consecutively occupied magnet wheel rotational positions 30, 31, 32, 33, 34, cause changes in the secondary and working flux 1, 3, 5, 7 in magnetic flux Ba in the first yoke core limb Ka (FIG. 4d) and changes in the secondary and working flux 9, 11, 13, 15 of magnetic flux Bb in the second yoke core limb Kb (FIG. 4b). It applies accordingly for the alternating voltage half-waves 2, 4, 6, 8 induced in the charging coil U1 from the charging coil U1 (FIG. 4c) and/or 10, 12, 14, 16 from the primary coil Lp of the pulse transformer U5 or any possible trigger coil U2 (see FIG. 4a). In FIGS. 4 and 5, the time histories for the individual limb magnetic fluxes Ba, Bb and the coil voltages PS, TS, LS are reciprocally plotted in relation to each other in the same chronological scale and equal time segments between individual magnet wheel rotational positions 30-34 as they occur in time synchronization. The voltages on the ordinate axes are represented with different scaling, according to the different number of turns per unit length in the coil.

Through the magnet wheel P that rotates synchronously with the motor of the combustion engine (see rotational direction D in FIG. 1), the magnet M and the magnetic pole shoes N, S (for North and/or South Pole), the iron yoke core K with both its protruding limbs Ka and Kb, are periodically subjected to a magnetomotive force from a magnetic field Ba, Bb across the air gap during each rotation. In the coils U1, U5, U2 on the limbs Ka, Kb, the first voltage swings 2, 10 in the coils U2, U5, U1 are generated due to the left-hand rotation D counterclockwise, when the center quadrature axis Q of the magnet M moves past the first rotational position 30 (see FIG. 1). The magnetic flux Ba in the first yoke core limb Ka in rotational direction D increases stronger when the magnet M moves past this position, than the magnetic flux Bb in the second yoke core limb Kb in rotational direction (compare FIG. 4d increase in secondary flux 1 with FIG. 4b, increase in secondary flux 9). If a so-called change in working flux 3 in the first yoke core limb Ka in rotational direction according to FIG. 4d occurs between the first rotational position 30 and the second rotational position 31 (sign reversal in magnetic flux), the alternating voltage half-wave 4 with the highest amplitude is accordingly induced in charging coil U1 within one rotation. Analogous, due to the change in working flux 13 (see FIG. 4b) of the third rotational position 32 and the fourth rotational position 33 in the second yoke core limb Kb in direction of rotation, an alternating voltage half-wave 14 with maximum amplitude (FIG. 4a) is caused around the fourth rotational position 33 within one rotation in the coils U2, U5 on the second yoke core limb Kb.

The induced alternating voltage half-waves and/or voltage levels 2, 4, 6, 8 and/or 10, 12, 14, 16 in the charging coil U1 and/or in the primary coil Lp of the pulse transformer U5 (or in the trigger coil U2, if necessary) can from the previously discussed signal level attenuation circuit U7—adapted to the measuring range of the control unit U8—be connected and entered to its input. Consequently, the half-waves can be easily scanned and internally evaluated and processed using analog/digital converter ADC or also comparators of a microcontroller as a control unit, for example.

Build-Up of the Supply Voltage for the Control within a Few Degrees of Angle

In order to facilitate the generation of an ignition spark during the first pass through TDC, when using memory programmable controllers, for example, its supply voltage must be built-up within few degrees of angle. The supply voltage VDD of a microcontroller, for example, must thus have sufficiently increased at the start within as few as possible degrees of angle, but can after the position of the magnet wheel has been detected and triggering of the ignition spark within the starting rotational speed range, drop again below the level required for operation.

According to FIG. 2, the voltage supply for the control unit U8, for example a microcontroller, is provided using a voltage supply unit U 10. The latter receives its energy directly from the first and third alternating voltage half-wave 2, 6 of charging coil U1 per revolution, since it is tapped ahead of the bridge rectifier G1 according to FIG. 4. At very low revolutions, the supply voltage build-up which is important for the ignition spark generation originates within the first alternating voltage half-wave of charging coil U1 per revolution. This first half-wave 2 still has a very small amplitude, since it comes from a magnetic secondary flux in the first yoke core limb Ka in rotational direction D (see FIG. 4d, secondary flux 1). Moreover, this is the rotational position range with the least moment angle velocity, since the piston in the combustion cylinder of the combustion engine is immediately before TDC here (TDC corresponds to rotational position 30 in FIG. 1) and for that reason builds up a high combustion pressure. The controller must therefore be operative within this first half-wave of relatively weak amplitude (an angular range around the peak of the half-wave is sufficient), in order to detect the rotational position of the magnet wheel P in due time and be able to activate the ignition switch.

This is rendered possible through the position detection concept described below, for example through a microcontroller as control unit U8. For that reason, it is also possible to use a buffer capacitor with relatively low capacity for the supply voltage, for example with 10 μF. As a result, the operating voltage in the starting rotational speed range is built-up correspondingly faster, but then also drops faster again. This is however not relevant for the determination of the rotational position in the starting rotational speed range.

The behavior of the supply voltage VDD is schematically represented in FIG. 5f. At voltages above the low voltage reset level LVR, the microcontroller U8 is ready for operation. This representation is based upon a rotational speed of 200 RPM. At the same time, sufficient operating voltage can be built up within approximately 10 degrees of angle of a crankshaft rotation. Consequently, this requires only a small pull on the starting rope (practical test, above a point of pressure of approximately 15 cm), which is beneficial when only little space is available. In this context, an approximately 0.8 m long rope enables five to six passes through TDC. For this purpose, the rotation of the crankshaft starting not later than 12 degrees of angle before TDC up to TDC should occur at the rotational speed of at least 200 RPM, in order to build up the supply voltage VDD from 0 Volt to the operational voltage LVR (the low voltage reset level with suitable commercially available microcontrollers is about larger or equal to 2.1 V). Due to the low starting rotational speed, the rotation of the engine through TDC and therefore through the compression cycle is possible with only a small power requirement. Magnet wheels with a diameter of $\geq 90$ mm are suitable for this purpose.

In order to ensure that the ignition is advanced, the first alternating voltage half-wave 2 (see e.g. FIG. 5d) from the charging coil U1 per revolution is used for triggering the ignition process. The increasing ignition advance with increasing rotational speed is based upon the fact that the amplitude of the charging coil signal Ls increases with increasing rotational speed, as shown in FIG. 5e, demonstrated by two respectively first alternating voltage half-waves LSn from charging coil U1 per revolution with different amplitudes, as follows: the first half-wave 2a with low amplitude per revolution corresponds to a lower rotational speed, and the first half-wave 2b per revolution with a higher amplitude, corresponds to a higher rotational speed. If, by exceeding a constant trigger voltage source Ux (FIG. 5e) because of the first alternating voltage half-wave 2 per revolution ignition occurs, the ignition point ZZP is now shifted increasingly to a constantly earlier time with respect to TDC with increasing rotational speed. At a lower rotational speed, the ignition then occurs at time t1, for example, (FIG. 5e, half-wave 2a) and at a higher rotational speed at an earlier time t2 with respect to TDC (FIG. 5e, half-wave 2b). Therefore, the ignition advance in the starting rotational speed range then continuously increases, because of the increasing rotational speed which occurs at the same time.

Detection of the Magnet Wheel Rotational Position in the Starting Rotational Speed Range Since an ignition spark should only be triggered in response to the first, but not to the third alternating voltage half-wave 6 from charging coil U1, it requires detection of the angular position and/or rotational position of the magnet wheel, without requiring the history of previous coil signals to be available. This is necessary, because the supply voltage and/or current supply VDD for the control unit U8 from the charging coil signal Ls must still rise above the "low-voltage level" LVR. At this point in time, the control unit U8 must be able to uniquely determine the rotational position of the magnet wheel P. This is made possible through the concept of detecting the rotational position 30 according to TDC, in that the control unit U8 (microcontroller) "wakes up" immediately after reaching its operating voltage VDD and immediately scans and checks the levels of the primary coil voltage PS. Without knowing the previous history of the coil signals and/or its sequence of half-waves, by acquiring the level of the primary coil voltage PS, using suitable software in control unit U8, it can be determined whether this is the first alternating voltage half-wave 10 or the third alternating half-wave 14 (see FIG. 5a).

According to FIG. 4b, a working flux change 13 occurs in the primary coil Lp of the pulse transformer U5 or in the trigger coil U2 when passing through specific rotational positions 32, 33 through the magnet M on the perimeter of the magnet wheel P, if necessary, wherefrom in the coils U2, U5 of the second yoke core limb Kb a third alternating voltage half-wave 14 of significantly higher amplitude and of longer duration results than with the previous. If these features cannot be determined when the trigger coil voltage threshold Ux is exceeded on the output of the primary coil of the pulse transformer U5 and/or the trigger coil U2 through scanning and subsequent processing in the control software, then it must be assumed that it occurs within one rotation of the first alternating voltage half-wave 10 in the primary coil Lp or in the trigger coil U2.

Above the rotational speeds of the starting range, sufficient supply voltage for the control unit U8 is available throughout one complete rotation, so that an appropriate microcontroller, for example, can continuously scan and evaluate the alternating voltage half-waves of the coil arrangement and therefrom determine the rotational speed. The period interval between the coil signals can also be determined, so that in this way the control unit U8 can retrieve the rotational speed information, using suitable software.

In accordance with an optional embodiment, the trigger voltage threshold Ux at which ignition occurs when it is exceeded can be adjusted or be applied switchable in the control unit U8. In this way, the ignition timing can be varied depending on starting, idling and/or operational range.

According to FIG. 6, the microcontroller, as control unit U8 for detecting the rotational position and/or angular position of the magnet wheel P, can be provided with a software routine. Immediately following the above described supply voltage buildup 40 through the charging coil U1, an initialization routine 41 is performed. Thereafter, using the analog/digital converter ADC (see FIG. 2), a value for the negative signal form LSn from the charging coil U1 is entered. If this value corresponds to a voltage level higher than 2 V (charging coil retrieval 42), for example, then a value c for the voltage signal PS from the primary coil Lp of the pulse transformer U5 is entered via the analog/digital converter ADC (see half-waves 10, 12, 14 in FIG. 4a). If according to the second primary coil retrieval 43, the scanned voltage value exceeds 500 mV, for example, then the rotational position 33 could exist, for example, but in any event not the rotational position 30 around TDC. In that case, the routine is diverted to an ignition disable command 44. If the value of the voltage signal PS from the pulse transformer U5 is smaller than the exemplary threshold of 500 mV, the procedure is diverted to an ignition enable command 45.

SCOPE OF APPLICATION

The invention is suitable for use with a capacitor ignition system for small internal combustion engines, in particular for hand-manipulated equipment, such as chainsaws.

| List of reference symbols | |
|---|---|
| P | Magnet wheel |
| M | Permanent magnet |
| Q | Center quadrature axis of the permanent magnet |
| S, N | Pole shoe |
| D | Directional rotation |
| K | Yoke core |
| Ka | First limb |
| Kb | Second limb |
| Km | Center section |
| L | Air gap |
| Ba, Bb | Magnetic flux |
| U1 | Charging coil |
| U2 | Trigger coil |
| U3 | Voltage supply of the controller |
| U4 | Energy storage element/ignition capacitor |
| U9 | Ignition switch |
| U8 | Control unit |
| U5 | Pulse transformer |
| U10 | Voltage supply unit |
| ADC | Analog-digital converter |
| A1, A2 | Signal scanning inputs |
| VDD | Operating voltage (2.1 ... 5.5 V) |
| LVR | Low Voltage Reset (2.1 V) - above this voltage, the microcontroller is ready for operation |
| U7 | Signal level attenuation circuit |
| R1, RS | Voltage divider |
| Z1 | Zener diode |
| LS | Induced voltage in the charging coil, with the half-waves 2, 4, 6, 8 (these correspond to the half-waves 2, 4, 6, 8 of FIG. 2c and FIG. 3b) |
| PS | Induced voltage in the primary coil with the half-waves 10, 12, 14, 16 |
| TS | Primary coil induced voltage in the trigger coil with the half-waves 10, 12, 14, 16 |
| LSp | Signal form of the charging coil U1 with positive half-waves 2, 4 and 8 |
| LSn | Signal form of the charging coil U1 with negative half-waves 2 and 6, rectified as positive half-waves for feeding the power supply U10 and for scanning by the microcontroller |
| a | Voltage signal of the trigger or auxiliary coil with the half-waves 10, 12, 14, 16 |
| b | Charging voltage of the ignition capacitor |
| c | Primary voltage signal, with the half-waves 10, 12, 14, 16 |
| d | High-voltage pulse |
| e | Drive pulse for the ignition switch U9 |
| k | Compensatory current of the ignition capacitor, current through the primary coil |
| G1 | Bridge rectifier |
| Lp | Primary coil of the ignition transformer U5 |
| Ls | Secondary coil of the ignition transformer U5 |
| FU | Ignition spark gap |
| GND | Ground |
| 30-34 | Rotational positions of the center quadrature axis Q |
| Ux | Voltage threshold of the charging coil, upon exceeding of which ignition is provided |
| 40 | Supply voltage build-up |
| 41 | Initialization routine |
| 42 | Inquiry of charging coil |
| 43 | Inquiry of primary coil |
| 44 | Ignition disable instruction |
| 45 | Ignition enable instruction |

The invention claimed is:
1. Electrical ignition method for combustion engines through the use of an arrangement of several coils (U1, LS; U2, TS; U5, Lp, Ls) and a magnet wheel or magnet generator (P, M, S, N) which rotates synchronously with the combustion engine, where the magnetic field of the magnet generator intermittently flows through the coils (LS, TS, Lp, Ls) and therein generates a sequence of magnetic flux changes (Ba, 1, 3, 5, 7; Bb, 9, 11, 13, 15), whereby a sequence of corresponding alternating voltage half-waves (2, 4, 6, 8;10, 12, 14, 16) is induced in the coils (U1; U2; U5), which are used:

for charging an energy storage element (U4), which is discharged by actuating an ignition switch (U9) via a primary coil (Lp) of a pulse transformer (U5) for initiating an ignition spark (FU), and for generating an operating voltage or voltage supply (VDD) for an electronic, analog or digital or programmable control unit (U8), which is deployed for actuating an ignition switch (U9) at an ignition point (ZZP) in dependence of the acquired alternating voltage half-waves (2, 4, 6, 8; 10,12,14,16) or from the state of the combustion engine, and through the use of a stop or switch-off system for the combustion engine, which prevents a discharge of the energy storage element (U4) during a stopping and coast down procedure of the combustion engine or actuates its charging, so that a charged energy storage element is available for the next start of the combustion engine, characterized by, (a) detecting alternating voltage half waves from two different limbs of a magnet generator (P,M,S,N) having an iron, soft-magnetic yoke core in a U-shape with, in the sequence of the rotational direction (D), a first limb (Ka) surrounded by a charging coil (U1) and a subsequent second limb (Kb) surrounded by at least the primary coil (Lp) of a pulse transformer (U5) or an auxiliary coil (U2);

(b) outputting signals (LSn, c, a) of both the charging coil (U1) on the first limb (Ka) and the primary coil (Lp) or the auxiliary coil (U2) on the second limb (Kb) each to the control unit (U8);

(c) for the purpose of inducing a continuous ignition advance (ZZP) as the rotational speed increases, detecting, using the control unit (U8), the chronological occurrence in each case of the first (2, 10) of the alternating voltage half-waves (2, 4, 6, 8;10, 12, 14, 16) by monitoring the voltage levels of the alternating voltage half-waves (2, 4, 6, 8;10, 12, 14, 16) and activating the ignition switch (U9), as the first (2, 10) of the alternating voltage half-waves occurs; and (d) building-up (40) the control unit's supply voltage through the charging coil (U1) on the first limb (Ka) whereby the control unit (U8) immediately scans and checks the levels (c,a) of the primary coil voltage (PS) or the trigger coil (U2) on the second limb (Kb) in order to determine whether there is the first (10) of the alternating voltage half-waves (10,12, 14, 16).

2. Electrical ignition method for combustion engines through the use of an arrangement of several coils (U1, LS; U2, TS; U5, Lp, Ls) and a magnet wheel or magnet generator (P, M, S, N) which synchronously rotates with the combustion engine, where the magnetic field of the magnet generator intermittently flows through the coils (LS, TS, Lp, Ls) and therein generates a sequence of magnetic flux changes (Ba, 1, 3, 5, 7; Bb, 9, 11, 13, 15), whereby a sequence of corresponding alternating voltage half-waves (2, 4, 6, 8;10, 12, 14,16) is induced in the coils (U1; U2; U5), which are used:

for charging an energy storage element (U4), which is discharged by actuating an ignition switch (U9) via a primary coil winding (Lp) of a pulse transformer (U5) for initiating an ignition spark (FU), and for generating an operating voltage or voltage supply (VDD) for an electronic, analog or digital or programmable control unit (U8), which is deployed for actuating an ignition switch (U9) at an ignition point (ZZP) in dependence of the acquired alternating voltage half-waves (2, 4, 6, 8; 10, 12,14,16) or from the state of the combustion engine and through the use of a stop or switch-off system for the combustion engine, which is technically designed or arranged for programming or switching to prevent a discharge of the energy storage element (U4) during a stopping and coast down procedure of the internal combustion engine or to actuate its charging, so that a charged energy storage element is available for the next start of the internal combustion engine, characterized by, (a) detecting alternating voltage half waves from two different limbs of a magnet generator (P,M,S,N) having an iron, soft-magnetic yoke core in a U-shape with, in the sequence of the rotational direction (D), a first limb (Ka) surrounded by a charging coil (U1) and a subsequent second limb (Kb) surrounded by at least the primary coil (Lp) of a pulse transformer (U5) or an auxiliary coil (U2);

(b) detecting the first (2, 10) of the alternating voltage half-waves (2, 4, 6, 8;10,12, 14, 16), outputting signals (LSn, c, a) of both the charging coil (U1) on the first limb (Ka) and the primary coil (Lp) or the auxiliary coil (U2) on the second limb (Kb) each to the control unit (U8);

(c) for the purpose of inducing a continuous ignition advance (ZZP) as the rotational speed increases, the control unit (U8) monitoring the first exceedance within each respective magnet wheel or magnet generator rotation of a preset trigger voltage threshold (Ux), at least by monitoring one alternating voltage half-wave by means of the control unit (U8) and the control unit (U8) actuating the ignition switch (U9) when the preset trigger voltage threshold (Ux) is exceeded by said first exceedance;

(d) building-up (40) the control unit's supply voltage through the charging coil (U1) on the first limb (Ka) whereby the control unit (U8) immediately scans and checks the levels (c,a) of the primary coil voltage (PS) or the trigger coil (U2) on the second limb (Kb) in order to determine whether there is the first (10) of the alternating voltage half-waves (10,12, 14, 16).

3. Ignition method according to claim 1 or 2, characterized in that the first occurrence per revolution of alternating voltage half-waves is monitored or detected via the control unit (U8) by means of voltage levels of different coils which are offset in relation to each other with reference to the magnet wheel or magnet generator.

4. Ignition method according to claim 1 or 2, characterized in that the ignition switch is actuated by means of an alternating voltage half-wave (2) per revolution which originates from the charging coil (U4) coupled to the energy storage element (U4).

5. Ignition method according to claim 4, characterized in that for the detection or for monitoring of the rotational position of the magnet wheel or the magnetic generator, whether within one revolution of the magnet wheel or the magnetic generator, the respectively first alternating voltage half-waves (2, 10) which occur, the voltage level of a trigger coil, ignition coil or a primary or secondary coil of a pulse transformer is monitored by means of the control unit (U8) or is compared with a preset threshold value.

6. Ignition method according to claim 1 or 2, characterized in that at each revolution at least one alternating voltage half-wave (2) is monitored via the control unit (U8) with respect to exceedance of a preset trigger threshold value (Ux), and that during the exceedance the rotational position of the magnet wheel or magnet generator (P, M, S, N) is determined by monitoring the voltage level of at least one further, isochronous alternating voltage half-wave (10), and that the ignition switch is actuated when the so determined rotational position (30) corresponds to respectively first occurring alternating voltage half-wave/s (2, 10) within one revolution.

7. Ignition method according to claim 1 or 2, characterized in that the monitoring of the voltage level of the alternating voltage half-waves comprises at least one comparison of the respective voltage level of an alternating voltage half-wave with one or multiple preset voltage thresholds in the control unit (U8), which correspond to those alternating voltage half of the waves which follow the first half-waves (2, 10) per revolution in each case.

8. Ignition method according to claim 1 or 2, characterized through the use of a combustion engine with a magnetic generator or magnet wheel, where the diameter is smaller than 130 mm or is at least 90 mm.

9. Ignition method according to claim 1 or 2, characterized in that the ignition switch (U9) for interrupting a current flow from the energy storage element (U4) is kept open during the stopping and coast down procedure.

10. Ignition method according to claim 1 or 2, characterized in that the energy storage element (U4), in order for it to be charged, is coupled with the charging coil (U1) or another coil carrying alternating voltage half-waves during the stopping and coast down procedure.

11. Ignition method according to claim 1 or 2, characterized in that the energy storage element (U4) is charged in such a manner during the stopping and coast down procedure, in that already during a first pass of a cylinder piston of the combustion engine through a top dead center (TDC) and actuation of the ignition switch (U9), a high-voltage pulse of at least 10 KV, results on the pulse transformer (U5).

12. Ignition method according to claim 11, characterized in that the control unit (U8) is technically so designed or arranged for programming or switching or a trigger voltage threshold (Ux) is placed such that at rotational speeds of approximately 150 revolutions to approximately 200 or 220 revolutions per minute (rpm) the ignition point (ZZP) is assigned to a range near the top dead center (TDC), so that a back kick during the start of the combustion engine will be counteracted.

13. Ignition method according to claim 12, characterized in that the range near TDC comprises 5 degrees of angle before and after TDC.

14. Ignition method according to claim 1 or 2, characterized in that for the control, a microcontroller or another microelectronic switch mechanism with an operating voltage (LVR—low voltage reset) from about 1.5 V to 2.5 V or from about 2 V or 2.1 V is used for the control.

* * * * *